Sept. 8, 1959　　　　L. W. FROMM, JR　　　　2,903,402
RECOVERY OF VALUABLE MATERIAL FROM GRAPHITE BODIES
Filed Sept. 26, 1951　　　　　　　　　　　2 Sheets-Sheet 1
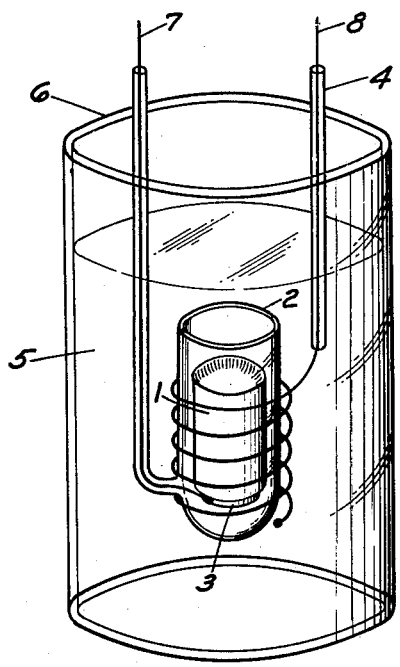
Fig. 1.
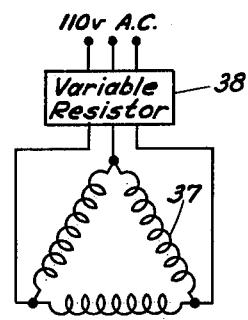
Fig. 3.
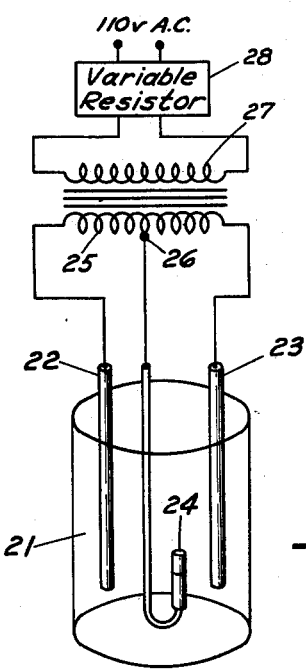
Fig. 2.
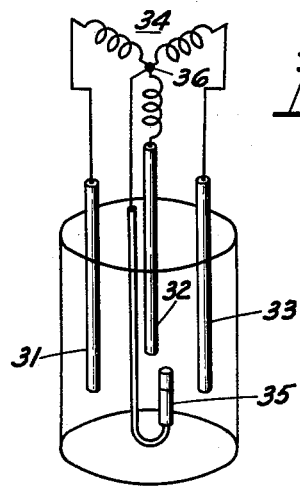
INVENTOR.
Leonard W. Fromm, Jr.
BY
Roland A. Anderson
ATTORNEY Sept. 8, 1959   L. W. FROMM, JR   2,903,402
RECOVERY OF VALUABLE MATERIAL FROM GRAPHITE BODIES
Filed Sept. 26, 1951   2 Sheets-Sheet 2
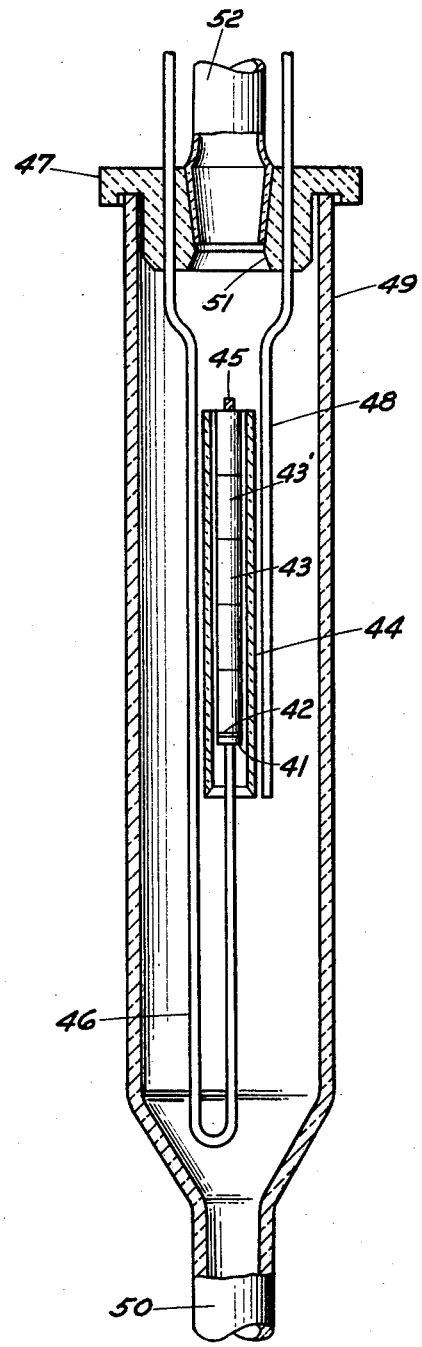
Fig-4-
INVENTOR.
Leonard W. Fromm, Jr.
BY
ATTORNEY

United States Patent Office 2,903,402
Patented Sept. 8, 1959

---

2,903,402

RECOVERY OF VALUABLE MATERIAL FROM GRAPHITE BODIES

Leonard W. Fromm, Jr., River Forest, Ill., assignor to the United States of America as represented by the United States Atomic Energy Commission Application September 26, 1951, Serial No. 248,292

13 Claims. (Cl. 204—1.5)

The present invention relates in general to a process for the recovery of valuable material, especially uranium values, from a graphitic mass containing the same, and more particularly to an electrolytic process for such purpose involving anodic disintegration of the graphitic mass.

As is known, in various processing operations in the art there obtain masses of graphite containing valuable material dispersed therein which is desired to be recovered. For example, in conventional devices, such as the calutron, for the electromagnetic separation of the isotopes of various elements, certain graphite apparatus parts, such as electrodes upon which the materials being isotopically separated continuously impinge in vaporous and ion-beam forms, frequently become substantially impregnated with those materials. The materials so impregnated into the graphite mass, which usually are electropositive-metal values, generally are isotopically enriched and hence extremely valuable, making exigent their recovery as completely as practicable. Currently, there is an even more pressing need for similar recovery of valuable materials contained in graphite fuel elements of neutronic fission reactors. Representative of such fuel elements are small, solid cylinders of graphite having dispersed therein a minor proportion of natural uranium, usually in the form of oxide. These elements are fabricated by such means as: immersing out-gassed, porous graphite cylinders in aqueous uranyl nitrate solution, followed by rapid drying and firing to convert the uranium solution in the interstices to sold uranium oxide; or, forming the cylinders by molding from a powdered admixture of carbon and uranium oxide, followed by graphitizing. A multiplicity of such fuel elements are disposed in channels within a neutron-moderating matrix adapted to accommodate the same, in clustered array and in sufficient number to sustain a chain, neutronic uranium fission reaction. Upon fissioning, atoms of uranium within the fuel elements are converted to highly-radioactive fission products; interference with reactor operation by fission products requires that their concentration within the reactor be kept at a very low level. Accordingly, each fuel element, upon attaining a relative fission product concentration of the order of a fraction of a percent of the uranium content, is customarily discharged from the reactor, to be processed for recovery and isolation of the remaining bulk of natural uranium for reuse in the reactor, and elimination to waste of the fission product contamination. In addition, similar graphite elements may be impregnated with materials other than uranium, to be inserted in the reactor. For example, elements containing cadmium compounds, which are highly neutron absorbent, may be provided for adjustable insertion in the reactor to control the rate of fissioning; various other materials to be irradiated to effect radioisotope production may be incorporated in graphite elements to undergo high-temperature irradiation in such refractory form. In such instances, the need for recovering the contained material likewise arises.

Upon proceeding to so recover values contained in graphite bodies, it has been found in the past that the refractory properties and marked insolubility of the graphite render the recovery especially difficult. Previously-conventional processes for such recovery have comprised, in general, either mechanical comminution of the graphite bodies followed by mineral acid leaching of the finely divided particles, or burning of the graphite, with or without initial comminution, followed by mineral acid leaching of the resulting ash. In both procedures, the leaching is sometimes followed by alkali fusion of the residue with subsequent further mineral acid leaching. However, these previous processes have not proven to be unqualifiedly satisfactory for the purpose. In mechanical comminution, deleterious amounts of foreign materials, such as iron, are often introduced from the abrading surfaces during crushing and grinding. In addition, despite the graphite's being reduced to minute size, occlusion of considerable amounts of the contained values is encountered. In burning the graphite, quantities of the uranium or other material to be recovered are entrained in the gaseous combustion products. To avoid excessive stack losses of the material, the combustion products must be extensively scrubbed, and even then there are still losses of the order of 1 percent of the uranium processed. Stack losses of even this small percentage are intolerable when handling radioactive fission products in the concentrations ordinarily occurring in fresh spent fuel elements, in that expulsion of hazardous amounts of radioactive material to the atmosphere would be incurred. Consequently, such fuel elements must be stored for protracted periods to permit radioactive decay before burning is permissible, adversely increasing grossly the inventory of fissionable material required for continuous operation of the reactor. Furthermore, the ash produced in burning tends to comprise refractory aggregates wherein appreciable portion of the uranium or other material to be recovered is unleachably occluded, even after alkali fusion. These discussed operations and systems wherein graphite bodies containing valuable materials obtain, and previously-conventional recovery methods applicable to the same, comprise the inventions and concepts of others, and do not, per se, constitute a part of the present invention. For further details concerning such previously-conventional recovery methods, reference is made to co-pending application of the common assignee:

Ser. No. 75,066, now Patent No. 2,797,081, in the names of Justin H. Allen, Edward J. Bair and Francis J. Sullivan, filed February 7, 1949, for Carbon Burner. For more particular details concerning the general nature, theory, construction, and operation of neutronic reactors, wherein such graphite fuel elements may be obtained, reference is made to:

"The Science and Engineering of Nuclear Power," edited by Clark Goodman, vols. I and II, Addison-Wesley, 1947–1949 (especially Chapter 9 of vol. I), and co-pending application of the common assignee:

Ser. No. 713,660, in the name of Farrington Daniels, filed December 3, 1946, for Atomic Power Plant.

In view of the aforementioned, and other disadvantageous characteristics of previously-conventional recovery methods, it has become highly desirable that other improved methods, of at least commensurate efficacy and preferably adapted simply to comprehensive remote control, be found.

Accordingly, one object of the present invention is to provide a new and improved method for the recovery of valuable materials, especially electropositive metal values, from graphite bodies having the same dispersed therein.

Another object is to provide such a method which is particularly adapted to the recovery of uranium values, especially uranium oxide, from graphite, neutronic-reactor fuel-elements.

A further object is to provide such a method wherein the uranium or similar valuable material is recovered in simple acid solution, thereby being in form eminently suited for further processing. Still another object is to provide such a method which affords substantially quantitative recovery, with minimization of losses of valuable material as occlusion in the graphite or its ash, and with avoidance of expulsion of adverse amounts of valuable material, or intolerable amounts of radioactive fission products, to the atmosphere.

Other objects will become apparent hereinafter.

In accordance with the present invention, valuable materials are recovered from a graphite body containing the same dispersed therein by a method which comprises disposing said graphite body as an anode in an electrolytic cell the electrolyte solution of which comprises an aqueous solution containing an oxygen-containing oxidizing anion, and passing an electrical current through an electrolytic circuit comprising said anode and said electrolyte solution, to thereby induce a progressive disintegration of said graphite body and, concomitantly, dissolvably liberate said valuable material into the electrolyte solution. Applicant has discovered that the presence of an oxygen-containing oxidizing anion in the electrolyte solution under such conditions is uniquely effective in affording, as an anode reaction, electrolytic disintegration of a graphite-body anode. It has been found that by such operation, progressive, rapid, and complete electrolytic disintegration of the graphite body into very fine particles can readily be accomplished, with rapidity and resulting particle size varying with anode current density and other electrolytic parameters. Complete disintegration of a typical graphite nuclear-reactor fuel elements to colloidal particle size has proven to be consistently achievable, with the total time required being a matter of mere minutes. In addition, it has been found that by virtue of such disintegration into so fine particle size, substantially the entirety of the valuable material originally contained in the graphite body is liberated therefrom. Moreover, it is in further accordance with the present invention to constitute the electrolyte solution of a solvent, desirably a strong mineral acid, for the valuable materials to be recovered. Thereupon, the valuable material is directly dissolved in the electrolytic solution, simultaneously with the disintegration, rendering it quickly and easily separable from the resulting graphite particles by simple mechanical means, such as centrifugation, filtration, decontamination and the like. Thus, in one simple operation, the valuable material is effectively separated from the graphite, affording virtually quantitative recovery efficiency. For example, this method when applied to a graphite fuel element containing ca. 15 percent by weight $UO_2$ dispersed therein, has been found capable of recovering ca. 99.8 percent of the original uranium, with the bulk of the graphite being disintegrated to below 500 micron particle size. Furthermore, the effective disintegration ideally adapts the graphite to subsequent acid leaching; by such extension of the processing, increase in recovery efficiencies to more than 99.98 percent of the uranium have been achieved. Being of such efficiency, with excessive losses due to unleachable occlusion, and evolution of gaseous combustion products, being substantially avoided, and being effectible in one simple direct operation readily adapted to remote control, the present process clearly affords significant practical advantages over earlier processes for the purpose.

For effecting the present invention, an electrolytic bath adapted to accommodate the graphite body to be disintegrated, at least partially immersed as the anode, is provided. The compositions of suitable electrolytic baths for the present method are subject to considerable variation. In general, satisfactory compositions are aqueous solutions, containing, essentially, a substantial concentration of an oxygen-containing oxidizing anion. It is generally desirable that such oxygen-containing anion have a standard oxidation potential (referred to the hydrogen-hydrogen ion couple as zero; unit activity; 25° C.) of at least 0.75 volt, and preferably a standard oxidation potential at least as great as that of nitric acid. In order that the solution may be effectively electrolized, it should meet the customary requirement of including sufficient strong electrolyte to provide a reasonable magnitude of electrolytic conductance. Suitable strong electrolytes for this purpose comprise strong acids and salts of strong acids and strong bases. Concentrations at least as great as 0.01 molar of strong electrolyte are ordinarily satisfactory for the purpose. The sources of the essential oxygen-containing oxidizing anion may often be themselves strong electrolytes, in which case such source may advantageously serve as the only strong electrolyte provided. For example, moderately concentrated nitric acid has proven to be eminently satisfactory for serving as the only strong electrolyte, while also providing the essential anion. Alternatively, strong acid or salt may be added to supply or supplement the strong electrolyte content of the essential-anion-containing solution. For example, where potassium chlorate provides the essential anion, it is desirable to include hydrochloric acid to afford appropriate electrolytic conductance.

Importantly, satisfactory composition of the electrolyte solution is controlled by the consideration that graphite disintegration is to be the predominant anode reaction. As is well known, the anode potential above which any certain anion engages in a particular anode reaction varies, qualitatively, inversely with the concentration of that anion in the electrolyte solution. Accordingly, for the present process, concentrations of the components of the solution ordinarily are to be so adjusted, that other, interfering anode reactions require a substantially more positive anode potential than that required for graphite disintegration. In particular, the especially detractive interference of anodic oxidation of hydroxyl ions of the water in the solution, with concomitant oxygen evolution, may be wholly avoided in this manner. That is, by adjusting either the pH, and with it the hydroxyl ion concentration, to a sufficiently low value, or the concentration of the oxygen-containing oxidizing anion to a sufficiently high value, the anode potential for hydroxyl ion oxidation is rendered substantially greater than that for graphite disintegration. In practice, it has been found that interference by hydroxyl ion oxidation is in most cases avoided by employing electrolyte solution that is merely acidic. In any event, since both anode effects—disintegration and oxygen-evolution—are directly observable, any such interference encountered is readily noticeable, and may thereupon be corrected with these conventional electrolytic techniques. Likewise, the potentials for anode reaction of other anions in the electrolyte solution, such as the anion of the incorporated strong electrolyte, should be rendered more positive than the disintegration potential, in the same manner, where necessary. The particularly preferred electrolyte solution, which has been found to eminently satisfy all the above requirements, for the recovery of uranium values as well as most other electropositive metal values, is aqueous, concentrated nitric acid.

Having provided such an electrolyte bath, the graphite body is inserted at least partially immersed therein, and electrolytic current is passed through the bath between the anode and a cathode in electrolytic current conducting relationship with the bath. In most instances, the cathode may conveniently be comprised of a chemically-inert, electronegative metal immersed elsewhere in the described electrolyte bath. However, where desirable, it may be disposed in a separate electrolyte bath, separated from the desired electrolyte bath by a conventional salt bridge or diaphragm, whereupon the described electrolyte bath serves merely as the anolyte. The latter arrangements are beneficial where adverse cathode reactions, such as tendency of the liberated valuable material to cathodically deposit, would be encountered if a single bath were used. However, where the liberated value material is one which cathodically deposits efficiency, e.g. copper, cathodic deposition may well be applied for simultaneously effecting recovery of that material from solution. In recovery of uranium values, employing a nitric acid solution, applicant has found a platinum cathode inserted in the same solution with the graphite body to be entirely satisfactory; in such case the predominant cathode reaction is hydrogen evolution and no adverse uranium deposition is incurred.

Investigation has revealed that the disintegrated graphite particles become increasingly smaller and more uniform in size with increase in anode current density; therefore, generally speaking, the higher the anode current density employed, the better. For bodies of high quality commercial graphite, anode current densities at and above about 1 ampere per sq. cm. have been found to afford consistently fine, uniform particle size, and avoid the erratic detachment of rather large chunks of graphite which obtains at much lower current densities. Anode current density of about 5 amp./cm.$^2$ appears to afford optimum results. Although such high optimum current density is effected by increasing the anode operating voltage toward potentials where interfering anode reactions would commence, it has been found that such potentials may be raised sufficiently, by electrolyte solution adjustment as hereinbefore outlined, that such adverse effects need not then be encountered.

Especially where the graphite bodies are elongated, it is particularly beneficial that electrolytic action be concentrated at the end of the body opposite that at which the electromotive force is impressed, by shielding the sides of the body with an electrically insulating screen. Otherwise, disintegration tends to be accentuated, with ultimate disruptive severage, at that portion of the rod nearest the latter end. A glass cylinder surrounding the sides of the graphite body, but open at one end to permit only the far end of the body to face unprotectedly out into the electrolyte bath, has been found to afford adequate protection in this connection.

Operating under the outlined conditions, the electrolysis is continued until all of the graphite body immersed in the electrolyte bath has been disintegrated. Effective dissolution of the valuable material by the electrolyte solution may often be assisted by heating or, better, boiling the bath. This is particularly true where the valuable material is uranium oxide being dissolved in concentrated nitric acid, where boiling of the bath throughout the entire electrolysis has been found to appreciably enhance the degree of uranium recovery. Alternatively, where an effective solvent for the valuable material has not been provided in the bath, dissolution of the valuable material may be effected either by adding an appropriate solvent to the electrolyte bath at the conclusion of the electrolysis, or by leaching of the solid material after separation from the bath.

The disintegration of the graphite bodies into very fine particles, accompanied by the contemporaneous dissolution of the valuable material, generally tends to afford, by itself, very close approach to quantitative recovery efficiency. Nevertheless, it is in further accordance with the present invention, especially in instances where the material to be recovered is extremely valuable, to supplement the electrolytic disintegration with subsequent leaching of any remaining valuable material from the residual disintegrated particles. Being finely divided, the graphite particles are readily slurried, preferably with boiling, in aqueous solvents for the valuable materials, and are ideally adapted to more radical pretreatments, such as burning and/or alkali fusion, before leaching. For example, in instances in the recovery of uranium oxides from graphite, where electrolytic disinegration in concentrated nitric acid has effected recovery of all but of the order of 200 to 400 parts (by weight) uranium per million parts disintegrated graphite, further recovery of all but ca. 55 parts per million was found achievable by three short leaches of the residual graphite particles with boiling concentrated nitric acid. Further investigation revealed that by subsequent burning of the graphite residue, leaching of the ash with concentrated nitric acid, fusing with sodium hydroxide, and releaching, the ultimate recovery could be raised to all but about one part per million. Advantageously, by so resorting to burning merely for retrieving last traces, the concentration of valuable material has become so low that the stack losses incurred are entirely negligible. Furthermore, the concentration of any radioactive material associated with the graphite particles will normally have become so low that its discharge to the atmosphere with the combustion product is tolerable; where it has not, appropriate storage to permit radioactive decay before burning will generally not involve adverse hold-up of any substantial amount of valuable material.

While conducting the present invention is not limited to any specific design of electrolytic apparatus, certain electrolytic systems devised by applicant and illustrated in the appended drawings have proven to be particularly efficacious for the purpose. In the drawings: Fig. 1 diagrammatically illustrates an electrolytic cell adapted to the disintegration of single graphite bodies; Figs. 2 and 3 schematically diagram specially-contrived electrolytic circuits for most simply operating the disintegration cell with, respectively, single phase, and three phase, alternating current power; and Fig. 4 is a cross-sectional illustration of a production-model apparatus, adapted to the continuous sequential disintegration of severalities of similar graphite bodies.

Referring to the simple electrolytic cell shown in Fig. 1, a short cylindrical rod 1, of graphite impregnated with uranium oxide to be recovered, is disposed within a short, vertical, glass, electrolytic-shield tube 2, rather close-fitting to the graphite rod, closed at the lower end, and opened at the top. The graphite rod is supported by, and in electrical contact with, a chemically-inert metallic anode-pedestal 3, in particular a horizontal spiral of platinum wire, situated in the lower portion of the shield tube 2. A platinum cathode 4 is positioned outside of, and in the vicinity of, shield tube 2. The described assembly is totally submerged in an aqueous concentrated nitric acid electrolyte bath 5, contained in a tank 6, provided therefor. Electrical leads 7 and 8, glass-sheathed for electrical insulation, are respectively connected to the anode-pedestal 3, and cathode 4.

In operation, the disposition of the graphite rod 1 in the shield tube 2, and its contact with the anode-pedestal 3, causes the top end of the graphite rod to become the predominantly operative portion of the anode. Upon passing electric current between the electrodes, through the electrolyte bath, particles of graphite detach themselves from the top of the graphite body, whereupon the electrolyte solution dissolves the uranium, and any uranium fission products associated therewith, liberated by the disintegration. The detached particles of graphite are caused to move out of the tube 2, by the action of convection currents from the electric-current-warmed graphite anode 1, and by electrolytic migration of the particles, which do contain some anodic charge, toward the cathode. Ordinarily, in employing the high current densities preferred, considerable heating of the system is incurred through power dissipation incident to the passage of electric current, often to the extent that boiling is incurred throughout most of the electrolysis. Such heating and boiling is particularly beneficial, in that it promotes disintegration into smaller particles sizes, and enhanced dissolution of the valuable material into the electrolyte solution. Accordingly, in circumstances where the electrolytic current flow is insufficient to effect suitable heating and boiling, it is ofttimes profitable to heat the electrolyte bath with auxiliary means such as electric bayonet heaters, or steam coils, disposed therein. With such effect, the electrolysis is continued until the graphite body is completely disintegrated. Thereafter, the electrolyte solution is separated from the obtained graphite particles by suitable means such as centrifugation, filtration, decantation and the like.

Proceeding from the basic electrolytic apparatus of Fig. 1, applicant has devised improvement modifications for markedly improving efficiency in industrial application. More particularly, although the present electrolytic operation essentially requires electrolytic current flow to be in substantially only one direction, means are provided for operating the electrolytic cells directly upon the more generally available alternating-current form of electric power. By so doing, need for separate alternating-current rectifiers or other sources of direct current is entirely eliminated. Specifically, it has been found that by merely employing a metal such as tantalum as the cathode, the simple electrolytic cell of Fig. 1, will effectively rectify its own current, and therefore operate directly upon an alternating-current power source. Characteristically, tantalum, as well as certain other metals (e.g. aluminum), by virtue of possessing a surface oxide which readily permits cathodic electron flow into the electrolyte but not anodic acceptance of electrons from the electrolyte, acts as an electrolytic valve, permitting current flow in substantially only one direction. Although tantalum is the particularly preferred metal for this purpose because of its resistance to chemical action, other metals known to have similar characteristics may likewise be employed as the cathode in electrolyte solutions in which they are not adversely corroded. Thereupon, as alternating current is fed into the cell, during the alternating-current half-cycle when the graphite is positive, proper electrolytic current flows and disintegration occurs; however, when the poles are reversed during the second half-cycle, essentially no current flows because the cathode has become anodic and therefore ineffective. Furthermore, by virtue of its aversion to accepting electrons from solution, tantalum may be employed, without electrical insulation, as the immersed electrical conductor leading to the graphite-body anode; by such arrangement, difficulties in breakdown of insulation by acid are wholly obviated. While such a tantalum anode lead has been noted to make poor electrical contact with the graphite body, satisfactory contact is afforded by simply interposing a platinum foil between the tantalum and graphite surfaces.

While operation of the simple cell of Fig. 1 with a tantalum cathode is intermittent, in that current flows during only half of each cycle, a circuit as shown in Fig. 2 affords achievement of full-wave rectification, with continuous current flow, within the cell. Referring to Fig. 2, electrolyte bath 21, has immersed therein two cathodes 22 and 23, constituted of tantalum or other metal of like rectification characteristics, and a graphite body 24, serving as the anode. The cathodes are connected to opposite ends of the secondary winding 25 of an alternating-current transformer, having a center tap 26 to which the anode is connected. The primary winding 27 of the transformer is connected, through a variable resistor 28 (or, alternatively, a variable auto-transformer), to a source of single phase alternating current. In operation, alternating-current potential is impressed across the primary winding 27, of the transformer, causes the polarity of the cathodes, 22 and 23, with respect to the anode 24 to be opposite one another, and to reverse between each half cycle. During one half-cycle, electrolytic current flows between the cathode which is of negative polarity with respect to the anode, but no current will pass through the other cathode of positive relative polarity because of its electrolytic-valve characteristics. With reversed polarity during the second half-cycle, the electrolytic current has shifted and is now between the second cathode and the anode, with the first cathode passing no current. In this manner, electrolytic current flow from the anode obtains during substantially the entire cycle, flowing in turn to one cathode and then the other cathode, as the relative polarity of each becomes negative. By appropriate adjustment of the variable resistor 28, the maximum voltage impressed between the anode and the pair of the cathodes may be precisely controlled.

In Fig. 3, the self-rectification feature is extended to operation upon three-phase alternating-current power. Referring to Fig. 3, the system employs three cathodes 31, 32, and 33, each of tantalum or like metal, with each cathode being connected to a different extremity of the secondary Y winding 34 of a delta-Y alternating-current transformer. The graphite-body anode 35, is connected at the point of juncture 36, of the branches of the Y secondary winding 34. The delta primary winding 37, of the transformer is connected through a three-phase variable resistor (or, alternatively, a variable three-phase auto-transformer) 38, to a source of three phase alternating-current power. In operation, since the polarity of each cathode is positive throughout a similar one half of the respective cycle of each, and since the respective cycles are, in succession, 120 phase degrees apart, electrolytic current will always be passing from the anode to at least one, and sometimes two, cathodes. In this system the electrolytic current advantageously fluctuates considerably less than in the two-phase operation of Fig. 2. Further extension of rectifying-electrodes and multiphase techniques will be readily apparent to those skilled in the art from the foregoing. For example, it is clear that even steadier current flow may be obtained with a three-phase power source, by employing 6 cathodes and a delta-star transformer.

Additional improvement for industrial application is provided by the designed production-model apparatus shown in Fig. 4. This design, besides including the feature of self-rectification of multi-phase power, also affords semi-continuous operation by being adapted to disintegration of a severality of similar graphite bodies in uninterrupted succession, being provided with a removable magazine affording charging of such severality into the electrolytic cell as a cartridged unit, and being provided with auxiliary means affording refluxed boiling of the electrolyte bath. Referring to Fig. 4, a horizontal anode-pedestal 41, of tantalum, having overlaid thereupon a platinum foil 42, supports a severality of right-cylindrical graphite rods 43, 43', in vertical, single-stack array, and in mutual electrically-conductive relationship with the anode-pedestal 41, through the platinum foil 42. Closely surrounding the stacked severality of bodies and also the anode-pedestal, is a vertical, elongated electrolytic-shield tube 44, of electrically insulating material (e.g. glass, porcelain, or the like), open-ended except for an integral, horizontal, traverse-bar 45, of electrically insulating material, spanning its upper end. This tube 44, is supported only by the resting of the traverse-bar 45 upon the uppermost of the stacked bodies 43, 43'. Anode-pedestal 41 is mounted upon one vertical leg, having a length exceeding that of the shield tube 44, of a U-shaped, tantalum, anode-lead rod 46, the other leg of which extends upwardly, outside of the shield tube 44, and is rigidly suspended from above from a cover block 47. Also rigidly suspended from the cover block 47, and vertically depending in close proximity to the shield tube 44, is a pair of cathodes (one not shown) 48, comprising tantalum rods spaced around tube 44, 120° apart from each other and the anode-rod 46. Surrounding the assembly so suspended from cover block 47, and closed at its upper end by the cover block, is an elongated, vertical tank 49, conically converging at its bottom into an integral drain tube 50, adapted to separable connection into valved piping (not shown). Formed in the cover block 47, is a port 51, directly above the electrolytic-shield tube 44, and adapted to the passage of said shield tube vertically therethrough. The port 51, by virtue of inwardly-converging tapered conical configuration, removably accommodates a similarly-tapered end of a vapor tube 52, leading vertically upwardly to a reflux condenser (not shown). In operation, the electrolytic-shield tube 44, removed from the tank 49, is inverted and charged with the severality of graphite bodies 43, 43′, the bodies being supported in the tube by the traverse bar 45, spanning the lower end of the tube. With the platinum-overlaid anode-support 41, together with associated apparatus in inverted position, the cartridge of graphite bodies in their containing-tube 44, is elevated until the top of the upper graphite body meets the platinum-overlaid anode-support 41. As one manner of effecting this, for example, the covered, and electrode containing, tank 49, disconnected from the valved piping and with the tapered-ended vapor tube 52, removed from the port 51, is inverted, and thereupon the cartridge of graphite bodies in their containing tube 44, is upwardly introduced into the tank 49, through the port 51, and elevated until the top of the upper graphite body meets the platinum-overlaid anode-support 41. Thereupon, the system is returned to its illustrated position, and, after connection of drain tube 50 to said valved piping of the tapered-ended vapor tube 52, the tank is filled to a level above the uppermost graphite body with electrolyte solution, and electrolytic current is passed employing a two-phase alternating-current circuit as in Fig. 2. Because of the shielding action of the electrolyte-shield tube 44, electrolytic disintegration proceeds with action focalized at the upper surface of graphite exposed through the upper, open end thereof. As the graphite bodies are successively attacked from the top of the stack to the bottom, the traverse-bar-supported electrolytic-shield tube 44, rides down the stack with the progress of disintegration, such that the distance relationships between the graphite anode surface under attack and the cathodes remain the same throughout the electrolysis. The dissipation of power, incident to the passage of electrolytic current, beneficially maintains boiling of the electrolyte solution throughout most of the electrolysis; thereupon the vapors, passing through the port 51, and into vapor tube 52, are condensed and reflux back into the tank 49. The disintegrated graphite particles pass away from the graphite surface and settle around the outside of the tube 44 down into the drain tube 50. Upon completion of the electrolysis, the descent of the tube 44, accommodated by the U-shape of anode lead 46, has terminated with traverse-bar 45 resting upon the platinum-overlaid anode-support 41. Thereupon, the electrolyte solution, together with the graphite particles, is drained into the said valved piping for graphite separation and further recovery processing. Thereafter, the tank 49, after appropriate disconnection, may again be inverted for withdrawing the tube 44, and recharging with a fresh severality of graphite bodies.

Further illustration of the quantitative aspects and preferred procedures of the present method is provided in the following specific examples. In Example 1, the electrolytic disintegration of unimpregnated graphite rods, in accordance with the present invention, employing various anodic current densities, and in some instances boiling of the electrolyte solution, is demonstrated.

EXAMPLE I 8 graphite rods, each a solid cylinder about 2 cm. diameter by 5 cm. long, were each, in turn, disintegrated in an electrolytic cell similar to that illustrated in Fig. 1. The electrolytic-shield tube of the apparatus used was a glass tube 1 inch in diameter and 3 inches long open only at its upper end. For each electrolysis, fresh concentrated aqueous nitric acid, approximately 15 N (or 70% by weight), to a level of approximately one half inch above the top of the graphite body, was employed as the electrolyte solution. The indicated electrolytic current was passed until the body was completely disintegrated. In most instances, the baths had reached the boiling point by the end of the run, although in the last run external heat was applied to maintain the bath boiling throughout the entire run to demonstrate the effect of the boiling action. The time required to achieve total disintegration varied from nine minutes for the 15 amp. run to 95 minutes for a 2.5 amp. run. Thereafter, the entire bath was filtered quantitatively and the graphite particles dried and weighed. Screen analysis by weight were made of the particles, using 30-, 40-, 60-, 80-, and 100-mesh screens. Results calculated from the analyses made are tabulated in Table I below. Since virtually all the action took place at the upper end surface of the graphite rod, the end area of 3.14 cm.$^2$ was used in calculating current densities for the table.

*Table I*

| Run No. | Current (amp.) | Current Density (amp./cm.$^2$) | Graphite[1] Recovery (percent) | Geometric Mean Diameter | | Standard Deviation | Weight Percent Under 500 Micron |
|---|---|---|---|---|---|---|---|
| | | | | By Weight (microns) | By Count (microns) | | |
| 1 | 15 | 4.8 | 100.90 | 236 | 69 | 1.98 | 87 |
| 2 | 15 | 4.8 | 101.06 | | | 2.02 | 79 |
| 3 | 10 | 3.2 | 101.13 | 297 | 81 | 2.20 | 74 |
| 4 | 7.5 | 2.4 | 102.12 | 307 | 58 | 3.16 | 58 |
| 5 | 5 | 1.6 | 101.35 | 394 | 12 | | |
| 6 | 5 | 1.6 | 100.93 | | | 7.06 | 33 |
| 7 | 2.5 | 0.8 | 101.04 | 1,200 | 0.048 | 3.99 | 75 |
| 8 (Boiled) | 5 | 1.6 | 98.04 | 216 | 1.35 | | |

[1] Based upon dry weight of graphite before and after. Presumably, the indicated recoveries being greater than 100% may be attributed to some slight oxidation of the graphite and/or the presence of a modicum of extraneous impurity, in addition to expectable slight analytical inaccuracy.

The data for graphite recovery percentage given in Table I shows that, within the studied range, graphite recovery is not measurably affected by variation in current densities. While the particle-size data is somewhat erratic, the tabulation of geometric mean diameter on a weight basis does show a tendency toward smaller average particles as current density increases. The standard deviation data definitely shows an improvement in uniformity with higher current densities.

The efficacy of the present method for recovering valuable materials from graphite bodies is illustrated in Example II. In this example, effects on recovery of uranium dioxide from graphite cylinders of current density, boiling during electrolysis, and supplemental boiling after electrolysis are demonstrated.

EXAMPLE II 4 runs, using three different procedures, were made, with apparatus and electrolyte as used in Example I, on graphite samples impregnated with $UO_2$ (natural uranium) by uranyl nitrate hexahydrate vacuum impregnation, rapid drying, and firing in inert atmosphere. The bodies were estimated to contain 12 to 15 percent uranium metal by weight. The separate procedures for the four runs are outlined below:

*Run 1.*—After the sample was placed in the apparatus and the acid added, the bath was brought to a boil by external heating in 35 minutes. While boiling continued, 5 amps. were passed until the sample was completely disintegrated; this occurred in 1 hour. The bath was then cooled, the remaining graphite filtered, and the uranium-bearing liquor evaporated and made up to a standard 1000 ml. for analysis.

*Run 2a.*—After the sample was placed in the apparatus and the acid added, 10 amps. were passed for 26 minutes, at which point disintegration was complete. During this period the bath temperature increased from 20° to 110° C. due to power dissipation within the liquid. The current was then shut off and the slurry of graphite particles in the nitric acid was boiled and concentrated for 2½ hours. The graphite was filtered off and the filtrate diluted to a standard 1000 ml. for analysis.

*Run 2b.*—The sample for this run was a piece sawed from the same original cylinder as the sample for run 2a and presumably containing the same uranium concentration. The same procedure as for 2a was used here, as a check. In this case, however, the current passing time was 30 minutes and the boiling and concentration time 3 hours.

*Run 3.*—After the sample was placed in the apparatus and the acid added, 10 amps. were passed for 28 minutes, at which time disintegration was complete. Due to internal power dissipation the temperature rose from 6° to 99° C. The bath was immediately cooled and filtered without boiling, and the filtrate was then concentrated and made up to 1000 ml. for analysis. The filtrate from each run was then analyzed. Afterwards, the filtrated graphite particles from each of the described runs were separately refluxed in fresh batches of concentrated nitric acids for a total of 183 hours, during which time the acid was changed twice, at the 24 hours and 58 hour points. At the end of the final leach, the graphite was filtered, dried, and analyzed fluorimetrically for remaining uranium. The data obtained are tabulated in Table II below.

*Table II*

RECOVERY OF URANIUM VALUES FROM GRAPHITE BY ELECTROLYTIC DISINTEGRATION

| Run No. | Uranium Remaining in Graphite Residue (parts per million by weight) | | Percentage of Original Uranium | | |
|---|---|---|---|---|---|
| | After Disintegration | After 183-hr. Leach | Recovered in Disintegration Run | Recovered in 183-hr. Leach | Remaining in Graphite Residue |
| 1 | 497 | 42 | 99.74 | 0.24 | 0.02 |
| 2a | 388 | 64 | 99.79 | 0.18 | 0.03 |
| 2b | 392 | 37 | 99.79 | 0.19 | 0.02 |
| 3 | 984 | 69 | 99.27 | 0.68 | 0.05 |

The virtually quantitatively recovery efficiency of the disintegration process, and the ease and effectiveness of further acid leaching of the disintegrated graphite powder, is readily apparent from the data in Table II. Also evidenced is the recovery improvement afforded both by boiling during electrolysis, and by supplemental boiling after conclusion of the electrolysis, in enhancing the degree of uranium recovery.

In Example III the relative efficiency of successive leaching after disintegration, and the efficacy of a production-model apparatus, such as that shown in Figure 4, are demonstrated.

EXAMPLE III

Three rods of uranium-impregnated graphite, similar in dimensions and method of preparation to those used in Example II, weighing a total of approximately 85 grams, and containing approximately 14 percent (by weight) uranium were used. These were mounted in an apparatus similar to that illustrated in Fig. 4 and employing the same electrolyte as in Examples I and II, and a current of 10 amperes (current densities 3.2 amps./cm.$^2$) was passed for 70 minutes, at which time the electrolytic disintegration was complete. The resulting slurrying of graphite powder in nitric acid was kept very close to its boiling point for one hour and then filtered and washed with water. The filtrate and subsequent wash liquids were concentrated and made up to standard volume for analysis, and the graphite residue dried, weighed and sampled. About ⅔ of the graphite was then subjected to 5 successive 1-hour leaches with boiling concentrated nitric acid. After each leaching the graphite was filtered, washed, and sampled; and the leach liquor and washes were concentrated and made up to a standard volume for analysis. The analytical results are tabulated in Table III below.

*Table III*

URANIUM RECOVERY BY ELECTROLYTIC DISINTEGRATION PLUS LEACHING

| Status in Run | Uranium Remaining in Graphite (parts per million-weight) | Uranium Recovered in Solution (grams) |
|---|---|---|
| After Disintegration | 141 | 12.15 |
| After 1st Leach | 80 | 0.00578 |
| After 2nd Leach | 68 | 0.0011 |
| After 3rd Leach | 55 | 0.00033 |
| After 4th Leach | ¹74 | 0.00050 |
| After 5th Leach | 56 | 0.00050 |

¹ Probably due to improper sampling.

As may be seen in Table III, under the conditions of the runs, beyond the first leach, additional leaches are of little or no value. 55 parts per million of uranium in the graphite by weight apparently represents about the minimum level to which the uranium content may be reduced by simple leaching in this instance; this represents approximately 0.03 percent of the original uranium. Nevertheless, where desired, most of this remaining uranium content is recoverable by proceeding at this point to apply more radical procedures such as burning and acid leaching of the ash, or alkali fusion of the graphite and/or ash, followed by further acid leaching.

While this invention has been described with particular emphasis upon its application to the recovery of specifically uranium oxide from graphite reactor-fuel rods, it is inherently of much wider applicability. The present method is also well adapted to the recovery of uranium fission products when contained in graphite bodies, for example in spent reactor fuel elements, especially when contained alone, as in such elements originally impregnated with only $U^{235}$, wherein the uranium has been completely fissioned. Furthermore, the method is applicable to the recovery of cadmium values from graphite rods impregnated with the same, which are useful as neutron-absorbing elements for adjustably controlling the rate of fissioning in neutronic reactors.

More broadly, the present invention is not necessarily limited to the processing of elements of nuclear reactors. It is of like efficacy in the recovery of various other valuable materials, especially electropositive metal values, from different sorts of graphite bodies wherein they have become dispersed. Various additional applications of the hereinbefore-disclosed methods will become apparent to those skilled in the art. It is therefore to be understood that all matters contained in the above description and examples are illustrative only and do not limit the scope of the present invention.

What is claimed is:

1. In the recovery of valuable material from a graphite body containing the same dispersed therein, a method for liberating the valuable material from the graphite body which comprises disposing said graphite body as an anode in an electrolytic cell the electrolyte solution of which comprises an aqueous solution of concentrated nitric acid, and passing an electrical current through an electrolytic circuit comprising said anode and said electrolyte solution to thereby induce a progressive anodic disintegration of said graphite body and, concomitantly, dissolvably liberate said valuable material into the electrolyte solution.

2. A method for the recovery of uranium values from a graphite body containing the same in the form of uranium oxide dispersed therein, which comprises disposing said graphite body as an anode in an electrolytic cell the electrolyte solution of which is constituted of an aqueous acidic solvent for uranium oxide and contains an oxygen-containing oxidizing anion in aqueous solution, passing an electrical current through an electrolytic circuit comprising said anode and said electrolyte solution to thereby induce a progressive anodic disintegration of said graphite body and, concomitantly, liberate said uranium oxide, which is thereupon dissolved in the electrolyte solution, and thereafter separating the uranium-values-containing electrolyte solution from the resulting particles of the disintegrated graphite.

3. The process of claim 2 wherein said aqueous acidic solvent for said uranium oxide is specifically aqueous strong mineral acid, and said oxygen-containing oxidizing anion has a standard oxidation potential, when under conditions of unit activity and 25° C., and referred to the hydrogen-hydrogen ion couple as zero, of at least as great as 0.75 volt.

4. The process of claim 2 wherein said aqueous acidic solvent for said uranium oxide is aqueous strong mineral acid, and said oxygen-containing oxidizing anion has a standard oxidation potential at least as great as that of nitric acid.

5. A method for the recovery of uranium values from a graphite body containing the same in the form of uranium oxide disposed therein, which comprises disposing said graphite body as an anode in an electrolytic cell the electrolyte solution of which is constituted of concentrated aqueous nitric acid, passing an electrical current through an electrolytic circuit comprising said anode and said electrolyte solution to thereby induce a progressive anodic disintegration of said graphite body and, concomitantly, liberating the said uranium oxide which is thereupon dissolved in the electrolyte solution, and thereafter separating the uranium-values-containing electrolyte solution from the resulting particles of disintegrated graphite.

6. A method for the recovery of uranium values from a graphite body containing the same in the form of uranium oxide dispersed therein, which comprises disposing said graphite body as an anode in an electrolytic cell the electrolyte solution of which is constituted of an aqueous solvent for said uranium oxide and contains an oxygen-containing oxidizing anion in aqueous solution, passing an electrical current through an electrolytic circuit comprising said anode and said electrolytic solution to thereby induce a progressive anodic disintegration of said graphite body while avoiding substantial anodic oxygen evolution, and, concomitantly, liberate said uranium oxide which is thereupon dissolved in the electrolyte solution, and thereafter separating the uranium-values-containing electrolyte solution from the resulting particles of disintegrated graphite.

7. A method for the recovery of uranium values from a graphite body containing same in the form of uranium dioxide dispersed therein, which comprises disposing said graphite body as an anode in an electrolytic cell the electrolyte solution of which is constituted of approximately 15 normal aqueous nitric acid passing an electrical current through an electrolytic circuit comprising said anode and said electrolyte solution to thereby induce a progressive anodic disintegration of said graphite body, and, concomitantly, liberate said uranium dioxide, which is thereupon dissolved in the electrolyte solution, and thereafter separating the uranium-values-containing electrolyte solution from the resulting particles of disintegrated graphite.

8. A method for the recovery of uranium values from a graphite body containing the same in the form of uranium oxide dispersed therein, which comprises disposing said graphite body as an anode in an electrolytic cell the electrolyte solution of which is constituted of aqueous concentrated nitric acid, passing an electrical current through an electrolytic circuit comprising said anode and said electrolyte solution at an anode current density at least as great as 1 amp./cm.$^2$ to thereby induce a progressive anodic disintegration of said graphite body and, concomitantly, liberate said uranium oxide which is thereupon dissolved in the electrolyte solution, and thereafter separating the uranium-values-containing electrolyte solution of the resulting particles of the disintegrated graphite.

9. The process of claim 8 wherein said anode current density is substantially 5 amp./cm.$^2$.

10. A method for the recovery of uranium values from a graphite body containing the same in the form of uranium oxide dispersed therein, which comprises disposing said graphite body as an anode in an electrolytic cell the electrolyte solution of which is constituted of aqueous concentrated nitric acid, passing an electrical current through an electrolytic circuit comprising said anode and said electrolyte solution while maintaining the electrolyte solution boiling, to thereby induce a progressive anodic disintegration of said graphite body and, concomitantly, liberate said uranium oxide, which is thereupon dissolved in the electrolyte solution, and thereafter separating the uranium-values-containing electrolyte solution from the resulting particles of disintegrated graphite.

11. A method for the recovery of uranium values from a graphite body containing the same in the form of uranium oxide dispersed therein, which comprises disposing said graphite body as an anode in an electrolytic cell the electrolyte solution of which is constituted of aqueous concentrated nitric acid, passing an electrical current through an electrolytic circuit comprising said anode, an external source of electromotive force in contact with one extremity of said anode, and said electrolyte solution, while maintaining all surfaces of said anode except an extremity opposite that of said contact substantially shielded from electrolytic action, to thereby induce a progressive anodic disintegration of said graphite body commencing from the unshielded extremity and, concomitantly, liberate said uranium oxide which is thereupon dissolved in the electrolyte solution, and thereafter separating a uranium-values-containing electrolyte solution from the resulting particles of disintegrated graphite.

12. A method for the recovery of uranium values from a graphite body containing the same in the form of uranium oxide dispersed therein, which comprises disposing said graphite body as an anode in an electrolytic cell the electrolyte solution of which is constituted of aqueous concentrated nitric acid, passing an electrical current through an electrolytic circuit comprising said anode and said electrolyte solution to thereby induce a progressive anodic disintegration of said graphite body and, concomitantly, liberate said uranium oxide which is thereupon dissolved in the electrolyte solution, then separating the uranium-values-containing electrolyte solution from the resulting particles of disintegrated graphite, and thereafter leaching the remaining particles of disintegrated graphite with aqueous strong mineral acid to recover residual uranium values therefrom.

13. A method for the recovery of uranium values from a graphite body containing same in the form of uranium oxide dispersed therein, which comprises disposing said graphite body as an anode in an electrolytic cell the electrolyte solution of which is constituted of aqueous nitric acid, passing an electrical current through an electrolytic circuit comprising said anode and said electrolytic solution to thereby induce a progressive anodic disintegration of said graphite body and, concomitantly, liberate said valuable material, which is thereupon dissolved in the electrolyte solution, then separating the uranium-values-containing electrolyte solution from the resulting particles of disintegrated graphite, and thereafter leaching the remaining graphite particles with aqueous strong mineral acid, burning the graphite particles, leaching the resulting ash with aqueous strong mineral acid, fusing the leached ash with alkali, and leaching the resulting fusion with aqueous strong mineral acid, to recover, as leachings, residual uranium values from the disintegrated graphite.

References Cited in the file of this patent

UNITED STATES PATENTS

| | | |
|---|---|---|
| 429,386 | Parrish | June 3, 1890 |
| 1,062,431 | Billiter | May 20, 1913 |
| 1,314,632 | Bullock | Sept. 2, 1919 |
| 1,378,834 | Bullock | May 24, 1921 |
| 1,600,730 | Haffner | Sept. 21, 1926 |

OTHER REFERENCES

Zeitschrift für anorganische Chemie, vol. 39 (1904), p. 473.